Patented Feb. 27, 1934

1,948,582

UNITED STATES PATENT OFFICE 1,948,582

ANTIOXIDANTS

James K. Hunt and George H. Latham, Wilmington, Del., assignors to E. I. du Pont de Nemours & Company, Wilmington, Del., a corporation of Delaware No Drawing. Application February 21, 1931
Serial No. 517,631

3 Claims. (Cl. 134—26)

This invention relates to antioxidants and to coating compositions containing them. More particularly the invention relates to an improved method of inhibiting oxidation of oil-type coating compositions in bulk.

It is well known that oil-type compositions such as paints, varnishes and enamels containing the so-called "drying oils", are subject to undesirable oxidation phenomena when stored in open or even closed containers. For example, many such products within a few days develop a tough, skin-like film over their surfaces when exposed to the air. This phenomenon is termed "skinning". Other compositions develop similar films near the bottom of the container, especially above the settled pigment. In this case the phenomenon is termed "blanketing". The objectionable features of such phenomena are obvious, i. e., cause loss of paint, varnish or enamel, create lumps or skins in the container which may interfere with the proper application of the protective or decorative coatings, cause inconvenience and loss of time in removing the skins, etc.

In addition to the above mentioned phenomena which may occur in relatively small containers, there is another type of deterioration which occurs in oil type paints, varnishes, enamels and "priming" compositions which are used in relatively large bulk in dipping tanks, etc., where large objects such as auto fenders are immersed in baths of the coating compositions, removed and allowed to dry. In these operations considerable aeration and agitation of the coating compositions necessarily occur, so that oxidation of the drying oils contained therein is promoted. In such cases, a phenomenon known as "breaking" often occurs after the dipping bath has been in use for a time. Skinning may also occur at the same time. "Breaking" is the separation from the vehicle (of the coating composition) of an insoluble phase of a cheesy nature possessing the characteristics of linoxyn or jellied varnish. The above mentioned phenomena of skinning, blanketing and breaking have been very troublesome and have caused much loss and inconvenience.

It is customary in the manufacture of oil-type coating compositions to add to the product a certain amount of a positive oxidation catalyst in order to accelerate the "drying" of the thin coating of the material when applied over the surface to be covered. For this purpose heavy metal salts are ordinarily used, such as those of manganese, lead or cobalt. While these "driers", as they are commonly called, are necessary to the ready formation of serviceable films of paints, varnishes, enamels and some primers for wood or metal, they often induce premature oxidation processes in the materials in bulk; these processes may lead to skinning, blanketing and breaking, as we have already described.

This invention has as an object a method of effectively inhibiting the oxidation of oil-type coating compositions in bulk while preserving satisfactory drying properties in the film. A further object is the production of improved coating compositions comprising drying oils.

The objects of the invention are, generally speaking, accomplished by adding a drier to an oil-type coating composition in an amount sufficient to induce the desired thin film drying rate, and then adding creosole in an amount sufficient to bring about the degree of retardation of the bulk-form oxidation required, as will more fully appear hereinafter.

We have found that if a paint, varnish or other oil-type coating composition which is susceptible to skinning, etc., be treated with small amounts of creosole, objectionable auto-oxidation phenomena are very definitely inhibited and yet drying of a film of the composition thus treated takes place in substantially the same length of time as when no antioxidant is used. Particularly, we have found that the use of creosole in such compositions as "baking primers" (i. e., metal primers which are dried at elevated temperatures) does not lead to difficulty in film set-up, because the agent, being fairly volatile (B. P. 22° C.), is readily driven off from the thin film of primer in the baking process.

Creosole is an organic substance belonging to the phenolic group of aromatic compounds. Its structural formula may be written thus:

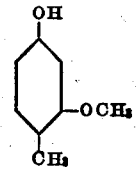

Coating compositions containing my new inhibitor, and the effect of the inhibitor upon skinning, breaking, and blanketing, are illustrated by the following examples:

*Example I*

A quick-drying colored enamel containing a synthetic resin was treated with 0.67% creosole (based on the oil content) and exposed to the air of the laboratory side by side in open cans with an untreated portion of the same enamel. The drying time of the two portions was also determined. The results were as follows:

| Enamel | Time for skin to form | Drying time (brush free) |
|---|---|---|
| Untreated | 40 hours | 2¾ hours. |
| Creosole treated | More than 192 hours | 3 hours. |

The term "brush free" referred to in the examples is that stage of dryness at which sand will not stick to a film of the coating composition when brushed firmly.

This enamel had the following composition:

Pigment
    Lithopone _____ 40.60
    Raw sienna _____ .30
Varnish vehicle No. 1
    Synthetic resin "A" _____ 8.00
    China-wood oil _____ 10.60
    Linseed oil _____ 1.40
    Red lead _____ .06
    Managanese oxhydrate _____ .03
    Cobalt linoleate _____ .14
Thinner _____ 38.79
Creosole _____ .08

100.00

Varnish vehicle No. 1 was made from the ingredients indicated by cooking according to usual varnish practice.

Resin "A" made by cooking together the following in the usual manner:

Percent
Glycerol _____ 15.12
Rosin _____ 57.62
Phthalic anhydride _____ 27.26

Example II

A white enamel containing an amberol resin was treated with 1.0% creosole (on the oil basis) and tested for skinning and drying side by side with an untreated portion of the same enamel, as in Example I. Results were as follows:

| Enamel | Time for skin to form | Drying time (brush free) |
|---|---|---|
| Untreated | 16 hours | 3 hours. |
| Creosole treated | 96 hours | 3 hours. |

This enamel had the following composition:

Pigment
    Titanox _____ 16.30
    Lithopone _____ 16.30
    Asbestine _____ 9.80
Varnish vehicle No. 2
    Amberol resin _____ 5.70
    Linseed oil _____ 5.00
    China-wood oil _____ 19.00
    Lead resinate _____ .30
Thinner _____ 27.36
Creosole _____ .24

100.00

Varnish vehicle No. 2 was prepared by cooking together, according to standard varnish procedure, the inregients indicated.

Example III

In this example creosole is used to inhibit the skinning of an enamel having the following composition and containing a natural resin:

Pigment
    Red lake _____ 10.70
    Iron oxide _____ 1.90
Varnish vehicle No. 3 _____ 36.50
Thinner _____ 50.44
Drier (cobalt linoleate) _____ .26
Creosole _____ .20

100.00

Varnish vehicle No. 3 was made by cooking together the following ingredients in the usual manner:

Percent
Rosin _____ 21.2
Linseed oil _____ 39.4
China-wood oil _____ 39.4

Example IV

A varnish containing a synthetic resin was treated with .34% creosole (based on the oil content) and tested for skinning and drying as in the previous examples. The results were as follows:

| Varnish | Time for skin to form | Drying time (brush free) |
|---|---|---|
| Untreated | 40 hours | 4¼ hours. |
| Creosole treated | 112 hours | 5½ hours. |

The composition of this varnish was as follows:

Varnish vehicle No. 4
    Synthetic resin "A" _____ 14.80
    China-wood oil _____ 19.30
    Linseed oil _____ 4.30
    Red lead _____ .12
    Manganese oxhydrate _____ .06
    Cobalt linoleate _____ .36
Thinner _____ 60.98
Creosole _____ .08

100.00

Varnish vehicle No. 4 was made according to usual varnish practice by cooking together the ingredients indicated.

Resin "A" was prepared as indicated under Example I.

Example V

A varnish containing a natural as well as a synthetic resin and having the following composition is greatly improved as regards skinning without materially affecting the drying time when treated with approximately 0.75% creosole (based on the oil content):

Varnish vehicle No. 5
    Amberol _____ 16.70
    Rosin _____ 1.50
    China-wood oil _____ 26.00
    Lead acetate _____ .20
    Cobalt acetate _____ .13
    Manganese resinate _____ .20
Thinner _____ 55.07
Creosole _____ .20

100.00

Varnish vehicle No. 5 was prepared according to standard varnish practice.

Example VI

A white paint for outdoor use was treated with 1% (based on the oil content) of creosole. It dried in 15 hours, compared with 13¼ hours for an untreated portion of the same paint and the paint thus treated showed a high resistance to skinning. The paint had the following composition:

| Pigment | Percent |
|---|---|
| White lead | 35.00 |
| Zinc oxide | 20.00 |
| Asbestine | 10.00 |
| Linseed oil | 29.00 |
| Thinner | 4.71 |
| Liquid lead-manganese drier | 1.00 |
| Creosole | .29 |
| | 100.00 |

The drier in the above example was of such composition as to give about .5% lead and .015% manganese on basis of oil content.

The creosole in each of the cases herein cited can be added directly or as a solution in alcohol, benzene, or other suitable solvent, after the paint or enamel is ground, either before reduction, or during reduction, or it can be added directly or in solution (in a suitable solvent) to the finished product by stirring it in well. In dip tank operation where the paint may remain in contact with air for considerable periods, the effectiveness of the inhibitor gradually diminishes. This may be counteracted by the addition of inhibitor from time to time in accordance with periodic accelerated aeration tests, whereby the resistance of the composition to breaking, etc. is determined in comparison with a control containing a known amount of creosole. The addition of inhibitor sufficient to maintain the required efficiency may, if desired, be made by adding a somewhat higher percentage of the inhibitor to the paint which is added to replenish the contents of the tank. Creosole is a liquid readily miscible with oils and thinners ordinarily used in oil-type coating compositions, and its incorporation into the product is a relatively simple matter.

The following examples are illustrative of the use of creosole in dipping compositions for preventing undesirable oxidation phenomena.

Example VII

An air-drying primer suitable for use in large dip tanks has the following composition:

| Pigment | |
|---|---|
| Lithopone | 40.00 |
| China clay | 14.00 |
| Varnish vehicle No. 6 | |
| Rosin | 6.00 |
| Linseed oil | 7.50 |
| China-wood oil | 6.20 |
| Litharge | .48 |
| Manganese oxhydrate | .12 |
| Cobalt linoleate | .19 |
| Thinner | 25.41 |
| Creosole | .10 |
| | 100.00 |

Varnish vehicle No. 6 was prepared according to standard varnish practice.

This product does not "break" or "skin" in use as it would were not creosole present, and its drying is not materially retarded by the inhibitor. The creosole in this case is added after the grinding operation and before reduction.

Example VIII

A baking primer suitable for use in dip tanks has the following composition:

| Pigment | |
|---|---|
| Litharge | 33.00 |
| Lamp black | 3.00 |
| Blanc fixe | 3.00 |
| Varnish vehicle No. 7 | |
| Rosin | 3.50 |
| Linseed oil | 7.00 |
| China-wood oil | 7.00 |
| Red lead | .17 |
| Manganese dioxide | .17 |
| Thinner | 43.11 |
| Creosole | .05 |
| | 100.00 |

Varnish vehicle No. 7 was prepared by cooking together in the usual manner the ingredients indicated.

This composition with creosole omitted is subject to skinning, blanketing and breaking. The creosole, incorporated after grinding and before reduction of the primer, inhibits skinning, blanketing, and breaking.

Example IX

The use of creosole as an antiskinning agent is further illustrated by the following synthetic resin varnish:

| | |
|---|---|
| Synthetic resin "B" | 33.30 |
| Thinner | 66.54 |
| Cobalt linoleate | .06 |
| Creosole | .10 |
| | 100.00 |

Resin "B" was made by cooking together the following ingredients in the usual manner:

| | Percent |
|---|---|
| Glycerol | 22.73 |
| Phthalic anhydride | 46.31 |
| Linseed oil fatty acids | 30.96 |
| | 100.00 |

Example X

Creosole is also effective as an inhibitor of skinning in such pigmented compositions as that illustrated by the formula below, in which the same resin is used as in Example IX:

| | |
|---|---|
| Lithopone | 41.80 |
| Synthetic resin "B" | 22.30 |
| Thinner | 35.79 |
| Cobalt linoleate | .04 |
| Creosole | .07 |
| | 100.00 |

The cobalt linoleate may, in this and in the preceding example, be incorporated with part of the thinner.

In the above examples, the term "thinner" refers to such solvents as turpentine, high-boiling gasoline and aromatic hydrocarbon solvents.

Among the several factors which determine the quantity of creosole to be used for the best results the following may be mentioned: The kind of oil used; the type and amount of drier present in the composition; the character of the pigment used; whether the coating is to be air dried or baked; and whether or not rapid drying is essential. While the optimum amount of creosole to be incorporated in any particular composition depends upon a number of factors, it may be stated that the amount used should be such as will not materially influence the rate at which the film of the composition attains the desired degree of dryness, but which is sufficient to inhibit the particular type of bulk-form oxidation to which the particular composition is subject. For compositions to be dried at ordinary temperatures, this amount usually varies from about 1/3 to 1% based on the oil content, or theoretical oil content (as in the oil modified polyhydric alcohol-polybasic acid resins in which there may be some question as to whether or not the fatty acid radicals are present as triglycerides), of the composition. We desire it to be understood, however, that we do not wish to be limited to these figures since larger or smaller quantities of the antioxidant may be used depending upon the conditions previously referred to. Thus in compositions which are dried at elevated temperatures, an amount of creosole in excess of 1% might be used without unduly retarding the drying of the film. Also, in certain compositions in which the tendency to auto-oxidation is not particularly pronounced, and which are dried at relatively low temperatures, 1/4% of creosole, or less, might be used to advantage.

Our new antioxidant may be used advantageously in any composition subject to objectionable oxidation phenomena in which the set up of the film is partially or wholly due to oxidation as distinguished from evaporation of a solvent, as in a nitrocellulose lacquer. Among the most common of this type of coating composition are the oil-type compositions. By the term "oil-type" as used herein, we refer to coating compositions which in film form dry substantially by oxidation and which contain a drying oil as such, or a modified form of drying oil, as for instance an oil modified polyhydric alcohol-polybasic acid resin, such as mentioned in Example IX. These resins may be viewed as modified drying oils. Resins of this type may be made by heating the drying oil acids with the other ingredients or they may be made by heating the drying oil itself with the glycerol and then heating the mono- or di-glycerides so formed with the polybasic acid until resinification occurs. In addition to glycerol, various other polyhydric alcohols such as glycol and pentaerythritol, may be used in making the oil modified polyhydric alcohol-polybasic acid resins as well understood by those skilled in the art. Likewise other polybasic acids such as succinic or maleic may replace the phthalic anydride. The oil-type compositions, as indicated in the examples, also include compositions containing resins and oil-modified resins in addition to drying oils.

In addition to its advantages in preventing undesirable oxidation phenomena in paints and varnishes in bulk, without appreciably retarding drying of films of these compositions when exposed to the air as in painting, creosole is less expensive than other negative-oxidation catalysts commonly used for the purpose, and being a liquid, it is readily incorporated into oil-type coating compositions.

As many apparently widely different embodiments of this invention may be made without departing from the spirit and scope thereof, it is to be understood that we do not limit ourselves to the specific embodiments thereof except as defined in the appended claims.

We claim:
1. A coating composition comprising a drying oil, a positive oxidation catalyst and creosole, the respective amount and character of said positive oxidation catalyst and creosole being sufficient to prevent oxidation of the composition in the bulk state without materially retarding the normal drying rate of the composition in the thin film form.

2. A coating composition comprising creosole and an oil-modified polyhydric alcohol-polybasic acid resin, the creosole being present in an amount sufficient to inhibit bulk form oxidation but insufficient to materially influence the drying rate of the composition in film form.

3. A coating composition comprising creosole, an oil-modified polyhydric alcohol-polybasic acid resin and a positive oxidation catalyst, the respective amounts and character of said positive oxidation catalyst and creosole being sufficient to prevent oxidation of the composition in the bulk state without materially retarding the normal drying rate of the composition in the thin film form.

JAMES K. HUNT.
GEORGE H. LATHAM.